United States Patent
Slothouber et al.

(10) Patent No.: US 9,571,900 B2
(45) Date of Patent: Feb. 14, 2017

(54) SYSTEMS, METHODS, AND APPARATUSES FOR ENHANCING VIDEO ADVERTISING WITH INTERACTIVE CONTENT

(75) Inventors: Louis P. Slothouber, Leesburg, VA (US); Aaron Ye, Ashburn, VA (US)

(73) Assignee: FOURTHWALL MEDIA, INC., Dulles, VA (US)

( * ) Notice: Subject to any disclaimer, the term of this patent is extended or adjusted under 35 U.S.C. 154(b) by 1036 days.

(21) Appl. No.: 12/751,273

(22) Filed: Mar. 31, 2010

(65) Prior Publication Data
US 2010/0257550 A1    Oct. 7, 2010

Related U.S. Application Data

(60) Provisional application No. 61/165,852, filed on Apr. 1, 2009.

(51) Int. Cl.
| | |
|---|---|
| *H04N 7/10* | (2006.01) |
| *H04N 21/8545* | (2011.01) |
| *H04N 21/236* | (2011.01) |
| *H04N 21/442* | (2011.01) |
| *H04N 21/658* | (2011.01) |
| *H04N 21/81* | (2011.01) |

(52) U.S. Cl.
CPC .... *H04N 21/8545* (2013.01); *H04N 21/23605* (2013.01); *H04N 21/44222* (2013.01); *H04N 21/6582* (2013.01); *H04N 21/812* (2013.01)

(58) Field of Classification Search
CPC ..... H04N 21/23; H04N 21/2223; H04N 14/21
USPC ................. 725/32, 34–36; 705/14
See application file for complete search history.

(56) References Cited

U.S. PATENT DOCUMENTS

| | | | |
|---|---|---|---|
| 5,521,927 A | 5/1996 | Kim et al. | |
| 6,169,542 B1* | 1/2001 | Hooks et al. | 715/719 |
| 6,198,509 B1* | 3/2001 | Dougherty et al. | 348/467 |
| 6,496,981 B1* | 12/2002 | Wistendahl et al. | 725/112 |
| 6,530,082 B1* | 3/2003 | Del Sesto et al. | 725/9 |
| 6,530,084 B1* | 3/2003 | Del Sesto et al. | 725/61 |
| 7,117,517 B1* | 10/2006 | Milazzo et al. | 725/60 |
| 7,222,155 B1* | 5/2007 | Gebhardt et al. | 709/204 |

(Continued)

FOREIGN PATENT DOCUMENTS

WO    WO 01/58159    8/2001

OTHER PUBLICATIONS

International Search Report for International Application No. PCT/US2010/029374, mailed Jun. 2, 2010.

(Continued)

*Primary Examiner* — An Son P Huynh
(74) *Attorney, Agent, or Firm* — Hunton & Williams LLP (57) ABSTRACT

A system for and method of enhancing video advertising with interactive content in accordance with exemplary embodiments may include receiving non-interactive video advertisement data and advertisement order data associated with the non-interactive video advertisement data, generating interactive content data associated with the non-interactive video advertisement data, embedding, in the non-interactive video advertisement data, the interactive content data, and transmitting, to an ad server component of an ad system, the non-interactive video advertisement data and the embedded interactive content data for transmission to one or more end user devices.

23 Claims, 4 Drawing Sheets

(56) References Cited

U.S. PATENT DOCUMENTS

| | | | |
|---|---|---|---|
| 7,752,642 B2* | 7/2010 | Lemmons | 725/34 |
| 7,805,746 B2* | 9/2010 | Brandyberry et al. | 725/110 |
| 7,950,041 B2* | 5/2011 | Sakamoto et al. | 725/112 |
| 8,116,520 B2* | 2/2012 | Reinpoldt, III | 382/103 |
| 2002/0056136 A1 | 5/2002 | Wistendahl et al. | |
| 2002/0120934 A1* | 8/2002 | Abrahams | 725/60 |
| 2003/0056219 A1* | 3/2003 | Reichardt et al. | 725/60 |
| 2003/0126611 A1 | 7/2003 | Chernock et al. | |
| 2003/0208767 A1* | 11/2003 | Williamson et al. | 725/93 |
| 2005/0034171 A1* | 2/2005 | Benya | 725/143 |
| 2005/0060745 A1* | 3/2005 | Riedl et al. | 725/42 |
| 2005/0137958 A1* | 6/2005 | Huber et al. | 705/37 |
| 2006/0130120 A1* | 6/2006 | Brandyberry et al. | 725/136 |
| 2007/0061724 A1* | 3/2007 | Slothouber et al. | 715/716 |
| 2007/0130581 A1* | 6/2007 | Del Sesto et al. | 725/36 |
| 2007/0157228 A1 | 7/2007 | Bayer et al. | |
| 2007/0276926 A1 | 11/2007 | Lajoie et al. | |
| 2009/0006191 A1* | 1/2009 | Arankalle | G06Q 30/02 705/14.71 |
| 2009/0089838 A1* | 4/2009 | Pino et al. | 725/40 |
| 2009/0089840 A1* | 4/2009 | Shusman | 725/51 |
| 2009/0150941 A1* | 6/2009 | Riedl et al. | 725/61 |
| 2009/0158317 A1* | 6/2009 | Sakhartov et al. | 725/32 |
| 2009/0158374 A1* | 6/2009 | Malaure et al. | 725/114 |
| 2009/0193456 A1* | 7/2009 | Ahn et al. | 725/32 |
| 2009/0210790 A1* | 8/2009 | Thomas | 715/719 |
| 2009/0210899 A1* | 8/2009 | Lawrence-Apfelbaum et al. | 725/34 |
| 2009/0222854 A1* | 9/2009 | Cansler | H04N 7/17318 725/35 |
| 2009/0307721 A1* | 12/2009 | Afram et al. | 725/34 |
| 2009/0317053 A1* | 12/2009 | Morley et al. | 386/68 |
| 2010/0299715 A1* | 11/2010 | Slothouber et al. | 725/118 |
| 2013/0061262 A1* | 3/2013 | Briggs et al. | 725/32 |
| 2013/0312029 A1* | 11/2013 | Huber et al. | 725/34 |

OTHER PUBLICATIONS

Craig Leddy: "<tru2way> guide", Cable and Telecommunications Association for Marketing, May 12, 2008, XP002676937, Retrieved from the Internet: http:/ /www.ctam.com/html/tru2way/guide.pdf [retrieved on May 30, 2012].

Supplemental European Search Report for European Application No. 10759339.4 mailed Jun. 12, 2012.

* cited by examiner

PRIOR ART

SYSTEMS, METHODS, AND APPARATUSES FOR ENHANCING VIDEO ADVERTISING WITH INTERACTIVE CONTENT

CROSS-REFERENCE TO RELATED APPLICATIONS

This patent application claims priority to U.S. Provisional Patent Application No. 61/165,852, filed Apr. 1, 2009, which is hereby incorporated by reference in its entirety.

FIELD OF THE INVENTION

The present invention relates to video advertising, generally, and systems, methods, and apparatuses for enhancing video advertising with interactive content, in particular.

BACKGROUND INFORMATION

In general, television distributors and television broadcasters may use a video advertising management system to manage video advertising spots (e.g., video advertisement data interspersed in regular television programming). These video advertising spots may be traditional non-interactive video advertisements. Such basic video advertisements, however, may not enhance an end user's viewing experience.

BRIEF DESCRIPTION OF THE DRAWINGS

Purposes and scope of exemplary embodiments described below will be apparent from the following detailed description in conjunction with the appended drawings in which like reference characters are used to indicate like elements, and in which.

SUMMARY OF EMBODIMENTS OF THE INVENTION

At least one exemplary embodiment provides a method of enhancing video advertising with interactive content. This embodiment includes receiving non-interactive video advertisement data and advertisement order data associated with the non-interactive video advertisement data, generating interactive content data associated with the non-interactive video advertisement data, embedding, in the non-interactive video advertisement data, the interactive content data, and transmitting, to an ad server component of an ad system, the non-interactive video advertisement data and the embedded interactive content data for transmission to one or more end user devices.

Another exemplary embodiment according to this invention provides a system for enhancing video advertising with interactive content. This embodiment includes an order manager computing apparatus configured to receive non-interactive video advertisement data and advertisement order data associated with the non-interactive video advertisement data, a creative manager computing apparatus configured to generate interactive content data associated with the non-interactive video advertisement data, and a publishing manager computing apparatus configured to embed, in the non-interactive video advertisement data, the interactive content data and transmit, to an ad server component of an ad system, the non-interactive video advertisement data and the embedded interactive content data for transmission to one or more end user devices.

DETAILED DESCRIPTION OF EMBODIMENTS OF THE INVENTION

The following description is intended to convey an understanding of the present invention by providing a number of specific embodiments and details involving the use of a companion system for enhancing interactive video advertising content. It is understood, however, that the present invention is not limited to these specific embodiments and details, which are exemplary only. It is further understood that one possessing ordinary skill in the art, in light of known systems and methods, would appreciate the use of the present invention for its intended purposes and benefits in any number of alternative embodiments, depending upon specific design and other needs.

Within the television industry, television distributors (e.g., cable television distributors, satellite television distributors, Internet Protocol Television (IPTV) distributors, Fiber Optic Service (FiOS) television distributors) and television broadcasters (e.g., MTV, ESPN) may utilize current advertising systems to manage video advertising spots. For example, these advertising systems may be configured to manage the video advertising spots from initial sale of the video advertising spots to the display of the video advertising content (associated with the video advertising spots) on end users' (e.g., viewers') televisions.

Interactive advertising systems may be configured to process and provide interactive video advertisement data (e.g., video advertising data that may allow an end user to provide input). Such interactive advertising systems, however, may rely on complex functions that significantly alter the extant non-interactive video advertising hardware infrastructure and workflow. For example, these interactive advertising systems may perform one or more late binding functions that include splicing one or more Enhanced TV Binary Interchange Format (EBIF) applications into a video stream as the stream is broadcast to a distribution network (e.g., in real time). Late binding functions may utilize one or more complex coordination mechanisms and one or more servers to manage each stage of the coordination and insertion process. In addition, to manage such complexity, these interactive advertising systems may replace a television distributor's existing order entry system and reporting system with new order entry components and reporting components.

This late binding approach may be used in response to the need to frequently update certain types of content, such as: campaign content and targeting content. Such frequently updated content may need the careful coordination with one or more software applications running (e.g., executing) on one or more customer premises equipment (CPE) devices.

Non-interactive advertising systems may be configured to process and provide non-interactive video advertisement data (e.g., video advertising data that may not allow an end user to provide input) by treating the non-interactive advertisement data as static assets to be transported from sub-system (e.g., component, process) to sub-system of the non-interactive advertising system as data files (e.g., static assets). These data files storing non-interactive video advertisement data may be stored in a database system until needed for broadcast to one or more CPE devices.

Figure 1:
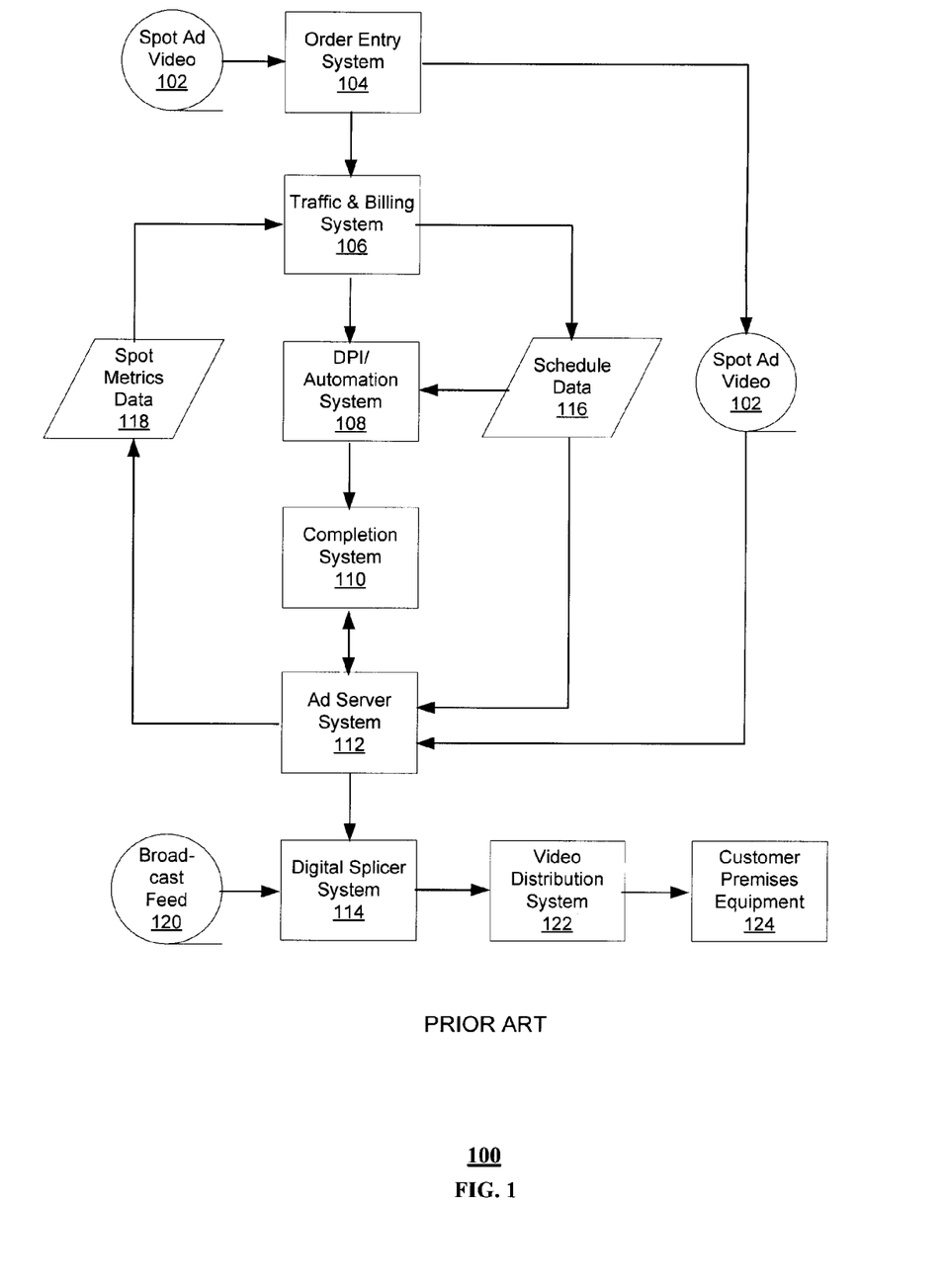
FIG. 1 is an exemplary diagram depicting a prior art non-interactive advertising system, in accordance with one or more exemplary embodiments.

FIG. 1 is an exemplary diagram depicting a prior art non-interactive advertising system, in accordance with one or more exemplary embodiments. Current non-interactive advertising systems may be configured to function in accordance with one or more functions illustrated in FIG. 1. For example, these non-interactive advertising systems may be configured to perform any, or a combination, of one or more order entry functions using an order entry system 104, one or more traffic and billing functions using a traffic and billing system 106, one or more DPI/automation functions using a DPI/automation system 108, one or more encoding functions using a completion system 110, one or more advertisement serving functions using an advertisement (ad) server system 112, and one or more digital splicing functions using a digital splicer system 114.

The order entry system 104 may include any, or a combination, of software and hardware configured to receive non-interactive video advertisement data 102 (e.g., a non-interactive Spot Ad Video). The non-interactive video advertisement data 102 may be produced by advertisers (e.g., advertisement agencies) and entered into a video distribution system (e.g., video distribution system 122) using an order entry function performed by the order entry system 104. The order entry system 104 may generate advertisement order data (e.g., data generated as a result of performing one or more order entry functions, meta data) corresponding to the non-interactive video advertisement data 102. The advertisement order data may include a spot identifier (e.g., a number, a string of characters) that has been assigned to the non-interactive video advertisement data 102 by the order entry system 104. The spot identifier may indicate a particular advertising spot associated with the non-interactive video advertisement data 102. The order entry system 104 may also perform format transcoding (e.g., converting data from one format encoding to another format encoding) of the non-interactive video advertisement data 102 in preparation for processing by the ad server system 112. The order entry system 104 may transmit advertisement order data to the traffic and billing system 106 for the performance of one or more traffic and billing functions and may transmit the non-interactive video advertisement data 102 to the ad server system 112 for the performance of one or more advertisement serving functions.

The traffic and billing system 106 may include any, or a combination, of software and hardware configured to receive advertisement order data from the order entry system 104 and receive spot metrics data 118 from the ad server system 112. Spot metrics data may include any data that indicates the value (or approximate value) of one or more statistical characteristics of a particular advertising spot (e.g., amount a particular advertising spot is viewed). Based on the spot metrics data 118 provided by the ad server system 112, the traffic and billing system 106 may generate schedule data 116 that indicates when the non-interactive video advertisement data 102 is scheduled for play-out (e.g., broadcasting to one or more CPE devices). The traffic and billing system 106 may instruct (e.g., initiate) the DPI/automation system 108 to generate one or more cue tone signals (e.g., according to a television standard, according to the Society of Cable Telecommunications Engineers (SCTE)-35 standard) in accordance with the schedule data 116. The traffic and billing system 106 may also handle measurement and reporting of the actual play-out (e.g., broadcast) of the non-interactive video advertisement data 102 for billing purposes based on the received spot metrics data 118. The traffic and billing system 106 may associate business and other fulfillment rules (e.g., rules that indicate when a video ad has been sufficiently advertised) with the non-interactive video advertisement data 102. The traffic and billing system 106 may transmit the schedule data 116 to the DPI/automation system 108 and the ad server system 112. The traffic and billing system 106 may also transmit the advertisement order data to the DPI/automation system 108.

The DPI/automation system 108 may include any, or a combination, of software and hardware configured to receive schedule data 116 and the advertisement order data from the traffic and billing system 106. The DPI/automation system 108 may be configured to generate cue tone signals in accordance with the schedule data 116. The cue tone signals may initiate the insertion of the non-interactive video advertisement data 102 into a broadcast feed (e.g., a video broadcast feed). The DPI/automation system 108 may transmit the advertisement order data to the completion system 110.

The completion system 110 may include any, or a combination, of software and hardware configured to receive the advertisement order data from the DPI/automation system 108. The completion system 110 may be configured to prepare the non-interactive video advertisement data 102 for play-out (e.g., broadcast) by encoding the non-interactive video advertisement data 102 accessed from the ad server system 112.

The ad server system 112 may include any, or a combination, of software and hardware configured to receive the non-interactive video advertisement data 102 and the schedule data 116. Based on the schedule data 116 generated by the traffic and billing system 106, the ad server system 112 may store the non-interactive video advertisement data 102 until it is scheduled for play-out. Once an appropriate cue tone signal is received from the DPI/automation system 108, the ad server system 112 may transmit the non-interactive video advertisement data 102 to the digital splicer system 114 for the performance of one or more digital splicing functions.

The digital splicer system 114 may include any, or a combination, of software and hardware configured to receive the non-interactive video advertisement data 102 from the ad server system 112. The digital splicer system 114 may be configured to splice the non-interactive video advertisement data 102 into a broadcast feed 120 (e.g., a Motion Picture Experts Group (MPEG) standard video transport stream). The broadcast feed 120 (e.g., MPEG video transport stream) transmitted to one or more CPE devices (e.g., customer premises equipment 124) communicatively coupled to a network via the video distribution system 122 (e.g., a system coupling one or more CPE devices to a television broadcasting system, a non-interactive advertising system, or both).

The network may be a wireless network, a wired network, or any combination of wireless network and wired network. For example, the network may include any, or a combination, of a fiber optics network, a passive optical network, a radio near field communication network (e.g., a Bluetooth network), a cable network, an Internet network, a satellite network (e.g., operating in Band C, Band Ku, or Band Ka), a wireless local area network (LAN), a Global System for Mobile Communication (GSM), a Personal Communication Service (PCS), a Personal Area Network (PAN), D-AMPS, Wi-Fi, Fixed Wireless Data, IEEE 802.11a, 802.11b, 802.15.1, 802.11n and 802.11g or any other wired or wireless network configured to transmit or receive a data signal. In addition, the data network 104 may include or connect to, without limitation, a telephone line, fiber optics, IEEE Ethernet 802.3, a wide area network (WAN), a LAN, or a global network, such as the Internet. Also, the network may support, an Internet network, a wireless communication network, a cellular network, a broadcast network, or the like, or any combination thereof. The network may further include one, or any number of the exemplary types of networks mentioned above operating as a stand-alone network or in cooperation with each other. The network may utilize one or more protocols of one or more network elements to which it is communicatively coupled. The network may translate to or from other protocols to one or more protocols of network devices. The network may include a plurality of interconnected networks, such as, for example, a service provider network, the Internet, a broadcaster's network, a cable television network, corporate networks, and home networks.

Television distributors may employ one or more standards for embedding interactive software applications (e.g., interactive video content, interactive video advertisement data) within broadcast streams (e.g., MPEG streams). For example, these one or more standards may include one or both of the EBIF standard created by CableLabs of Louisville, Colo., USA and the OpenCable Application Platform (OCAP) standard. Subsequently, these embedded interactive software applications may be transmitted (e.g., distributed, delivered, broadcast) to one or more CPE devices (e.g., set-top boxes, interactive-ready TVs, computers, cell phones). Based on these approaches in conjunction with systems, methods, and apparatuses disclosed herein, application delivery mechanisms that use complex synchronization techniques may not be necessary.

In one embodiment, interactive software applications encoded in accordance with the EBIF format may be transmitted along with one or more video streams. Accordingly, one or more end users (e.g., TV viewers) may be allowed to interact with the interactive software applications (e.g., interactive video ads, interactive video advertisement data) using an input device (e.g., a TV input device, a TV remote control, a keyboard). These EBIF applications may also collect information (e.g., data) that indicates the interactions between a viewer and the TV. In some embodiments, such information may be transmitted to television distributors and advertisers to support the measurement of ad viewership and response.

Certain embodiments of the present invention provide an end-to-end companion interactive advertising system for adding interactivity to video advertisements in conjunction with extant non-interactive advertisement systems (e.g., the non-interactive advertisement system described in FIG. 1) used by television distributors and television broadcasters. In some embodiments, this process may be performed by the EBIF application such that coordination with one or more cooperating applications running continuously on one or more CPE devices is not needed. Since real-time modifications to a video stream (e.g., MPEG video stream) may not be necessary, an early binding mechanism may be used. In one embodiment, an early binding mechanism may be configured to embed interactive video advertisement data (e.g., an EBIF application) within a video advertisement early in a video advertising workflow.

In some embodiments, a companion interactive advertising system may be configured to transparently (e.g., seamlessly) create and embed interactive video advertisement data (e.g., one or more EBIF applications) into non-interactive video advertisement data (e.g., one or more video advertisements, video advertisement content) as the non-interactive video advertisement data is transmitted from an order entry system (e.g., order entry system 104) to an ad server system (e.g., ad server system 112). The ad server system may store the interactive-enabled video advertisement data (e.g., EBIF-enabled interactive video advertisement data) until needed for broadcast transmission into a broadcast video stream. This companion interactive advertising system may create an interactive video advertisement such that the interactive video advertisement data operates or functions as a static asset (e.g., non-interactive video advertisement data and interactive video advertisement data, non-interactive video advertisement data and EBIF application). Accordingly, the interactive video advertisement may be processed and treated as non-interactive video advertisement data by the infrastructure of the non-interactive advertisement system. When the interactive video advertisement is received by a CPE device, the embedded interactive video advertisement data (e.g., EBIF application) may be detected and processed (e.g., executed).

In some embodiments, the companion interactive advertising system may not replace existing order entry systems or campaign management systems in use by television distributors or television broadcasters. Further, the companion interactive advertising system may be configured to manage the creation and embedding of interactive video advertisement data (e.g., an EBIF application) and the generation of measurement reports aggregating metrics data generated by the interactive video advertisement data (e.g., the EBIF application).

The benefits of the companion interactive advertising system may include the following. Existing infrastructure of a non-interactive advertisement system may be used to coordinate the management and delivery of the interactive video advertisement data (e.g., interactive EBIF applications). Similar to the non-interactive advertising system's treatment of non-interactive video advertisement data as static assets to be transported from process to process as data files and stored in a database system until needed for broadcast, an embodiment of the present invention may allow interactive video advertisements with embedded interactive video advertisement data (e.g., an EBIF application) to be managed as static assets along-side the non-interactive video advertisement data. Since EBIF software applications may return extensive usage metrics and campaign fulfillment data (e.g., T-commerce (E-commerce using digital television) orders data, request-for-information data), one or more reports generated by the companion interactive advertising system may provide more accurate viewership and interaction data (rather than estimates). The reports generated from this data may be associated with one or more advertising identifiers associated with the extant order entry system or campaign management system. Accordingly, report augmentation and comparison may be facilitated without replacing extant systems.

Figure 2:
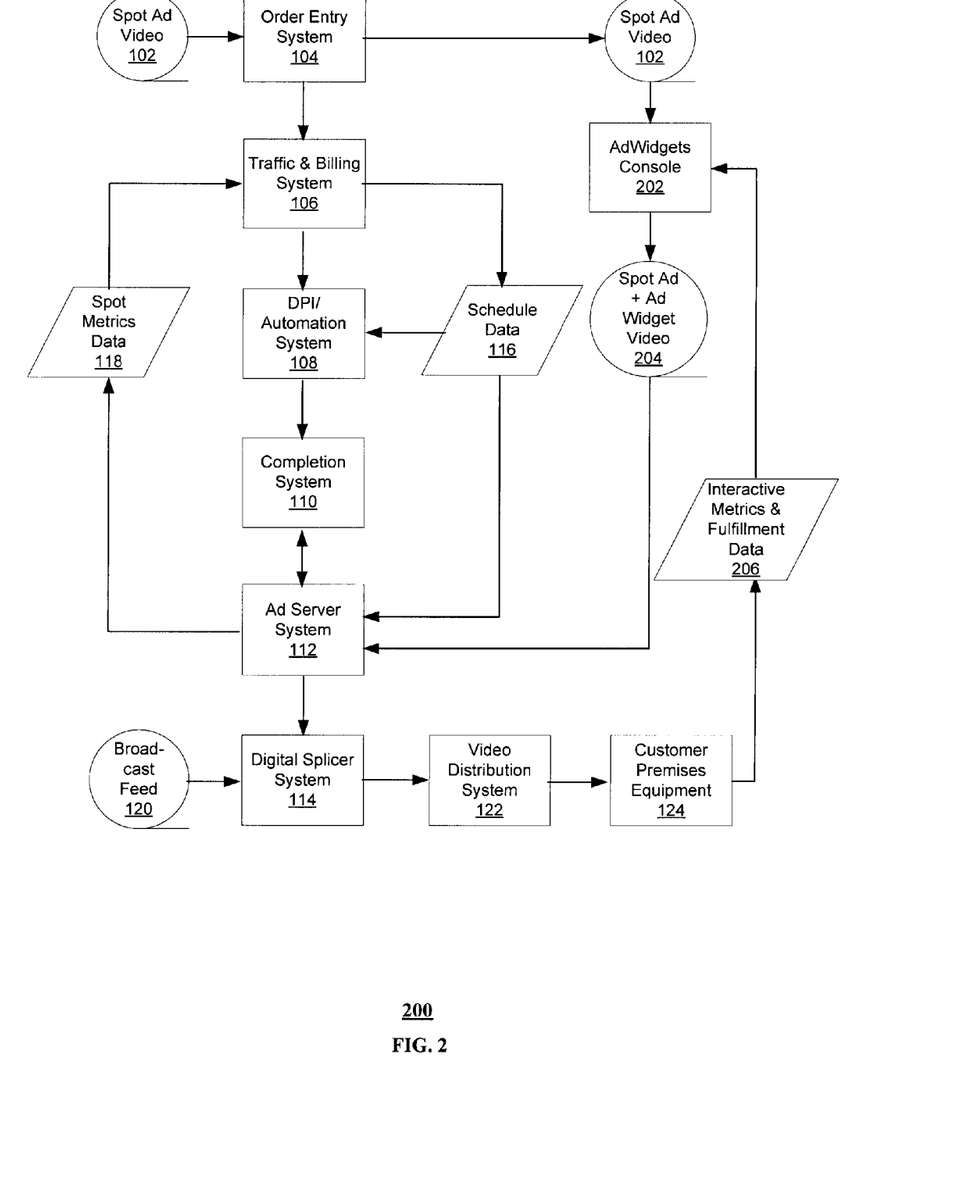
FIG. 2 is an exemplary diagram depicting elements of a companion interactive advertising system, in accordance with one or more exemplary embodiments.

FIG. 2 is an exemplary diagram depicting elements of a companion interactive advertising system, in accordance with one or more exemplary embodiments. An adwidgets console 202 may a component of the companion interactive advertising system. The adwidgets console 202 may include any, or a combination, of software and hardware configured to access non-interactive video advertisement data 102 entered into an extant non-interactive advertising system via an existing order entry system 104. The adwidgets console 202 may be configured to associate interactive video advertisement data with the non-interactive video advertisement data 102. A spot identifier assigned to the non-interactive video advertisement data 102 by the order entry system 104 may be copied into the meta data of the interactive video advertisement data to provide a mechanism to synchronize the reporting of interactive metrics data (e.g., usage data) fulfillment data with the reporting of spot metrics data. U.S. patent application Ser. No. 11/532,286 to Slothouber et al. filed Sep. 15, 2006 and entitled "Self-Contained Mini-Applications System And Method For Digital Television," hereby incorporated by reference herein, discloses methods and systems for creating and implementing self-contained mini-applications (e.g., widgets).

The adwidgets console 202 may be configured to manage the creation and embedding of the interactive video advertisement data (e.g., an EBIF application) into the non-interactive video advertisement data 102. Accordingly, the adwidgets console 202 may transmit non-interactive video advertisement data and embedded interactive video advertisement data 204 to the ad server system 112. The adwidgets console 202 may also be configured to receive interactive metrics data and fulfillment data 206 generated by the interactive video advertisement data (e.g., an executed EBIF application) at one or more CPE devices. The adwidgets console 202 may manage the generation of measurement reports that aggregate the interactive metrics data and fulfillment data 206.

It should be noted that similarly named functions and systems depicted in FIG. 1 and FIG. 2 may perform one or more similar functions. Thus, the companion interactive advertising system interoperate seamlessly with existing prior art systems and need not replace existing order entry or campaign management systems already in use by television distributors and television broadcasters. It should be noted that the non-interactive advertisement system illustrated in FIG. 1 is exemplary. The companion interactive advertising system may interoperate with other non-interactive advertisement systems.

The interactive video advertisements (e.g., interactive video assets) created by the companion interactive advertising system may appear to be identical to the non-interactive video advertisements (e.g., non-interactive video assets) from the perspective of the extant non-interactive advertisement system. Accordingly, the embedded interactive video advertisement data (e.g., the embedded EBIF application) may become a part of a video asset and may be ignored by the remainder of the extant non-interactive advertisement system. When the video advertisement that has been enhanced with interactive content (e.g., interactive video advertisement data) reaches a CPE device (e.g., customer premises equipment 124), the embedded interactive video advertisement data (e.g., an EBIF application) may be detected and processed (e.g., executed). Usage interactive metrics data and fulfillment data 206 may be transmitted to the companion interactive advertising system (e.g., adwidgets console 202) to augment the spot metrics data 118 provided to the traffic and billing system 106.

Figure 3:
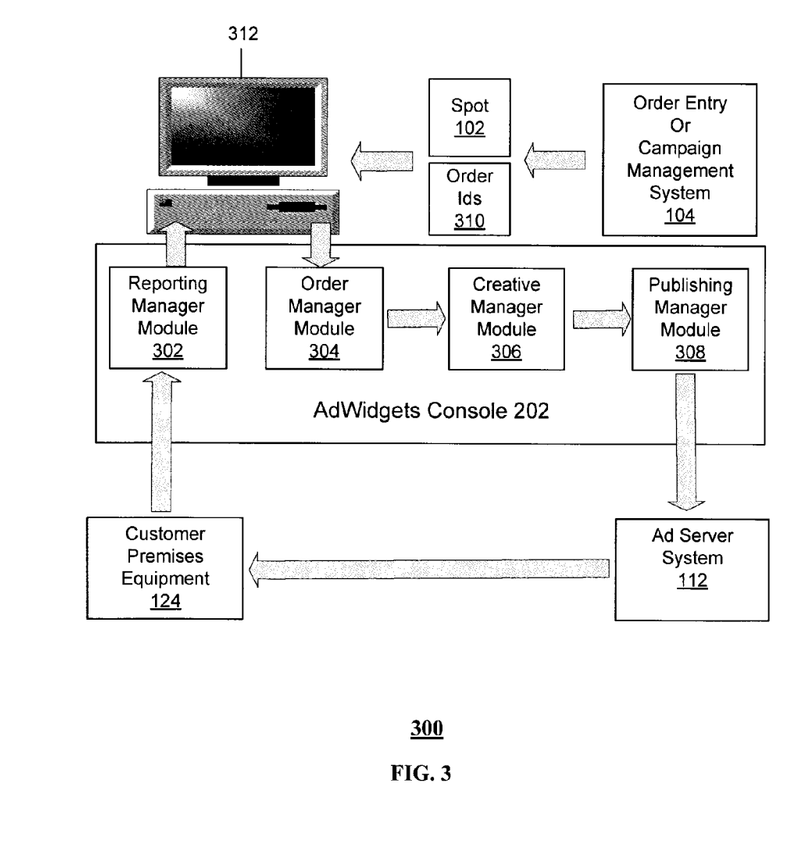
FIG. 3 is an exemplary diagram illustrating exemplary modules that perform one or more operations of the companion interactive advertising system, in accordance with one or more exemplary embodiments.

FIG. 3 is an exemplary diagram illustrating exemplary modules that perform one or more operations of the companion interactive advertising system, in accordance with one or more exemplary embodiments. The operations of the companion interactive advertising system 300 may be managed by a campaign workflow assistant (e.g., adwidget console 202). In an exemplary embodiment, the adwidgets console 202 of the companion interactive advertising system 300 may include a reporting manager module 302, an order manager module 304, a creative manager module 306, and a publishing manager module 308. It is noted that modules 302, 304, 306, and 308 are exemplary. The functions of modules 302, 304, 306, and 308 may be performed at other modules remote or local to the adwidgets console 202, and modules 302, 304, 306, and 308 may be combined or separated. Other modules may be provided as necessary and/or desired.

The order manager module 304 may include any, or a combination, of software and hardware configured to receive (e.g., ingest, access) non-interactive video advertisement data and information associated with the advertising order (e.g., campaign identifiers for reporting). The order manager module 304 may also receive one or more spot identifiers and one or more order identifiers 310 associated with the non-interactive video advertisement spot 102 (e.g., non-interactive video advertisement data 102).

The creative manager module 306 may include any, or a combination, of software and hardware configured to allow a user to create interactive video advertisement data (e.g., an EBIF application). In one embodiment, the creative manager module 306 may provide the user with a step-by-step process to define an EBIF application user interface and create the defined EBIF application. The user may use a end-user system (e.g., a computer display 312) to create the defined EBIF application.

The publishing manager module 308 may include any, or a combination, of software and hardware configured to embed the interactive video advertisement data (e.g., an EBIF application) into the non-interactive video advertisement data 102. In one embodiment, embedding may include encapsulating the non-interactive video advertisement data into a packetized stream (e.g., an MPEG Packetized Elementary Stream (PES)) and encapsulating the interactive video advertisement data (e.g., an EBIF application) into another packetized stream (e.g., an MPEG Packetized Elementary Stream (PES)). The publishing manager module 308 may also reference each packetized stream by a packet identifier (e.g., PID) in a distinct program map table (PMT). The publishing manager module 308 may transmit the resulting video file (e.g., the non-interactive video advertisement data embedded with interactive video advertisement data) to an extant ad server system 112.

As previously discussed, the companion interactive advertising system may be transparent to the extant order entry system (or other campaign management system) 104 and extant ad server system 112. In the non-interactive case, an order entry system (or campaign management system) 104 may transmit one or more video assets (e.g., MPEG-2 transport streams, non-interactive video advertisement data) to an ad server system 112. In the interactive case, the companion interactive advertising system may be inserted between an order entry system 104 and an ad server system 112. The output of the companion interactive advertising system (e.g., the video file containing non-interactive video advertisement data and interactive video advertisement data, order information) may appear to be identical to the video asset produced in the non-interactive case since the embedded interactive video advertisement data (e.g., EBIF application) is effectively invisible. Accordingly, in both the interactive and non-interactive case, the video file transmitted to the ad server system may be a static asset. Scheduling or coordination may be managed elsewhere by the extant non-interactive advertising system.

The customer premises equipment (CPE) device 124 may include an user agent (e.g., an EBIF user agent) configured to provide the application execution engine upon which the EBIF applications run. The CPE device 124 may also include a communication mechanism configured to transmit interactive metrics format data and fulfillment data to the reporting manager module 302. The interactive metrics format data and fulfillment data may be transmitted in a particular format, such as an EBIF application metrics reporting format.

The reporting manager module 302 may include any, or a combination, of software and hardware configured to process the interactive metrics format data and fulfillment data. In one embodiment, the reporting manager module 302 may process the interactive metrics format data and fulfillment data to update spot metrics data.

Figure 4:
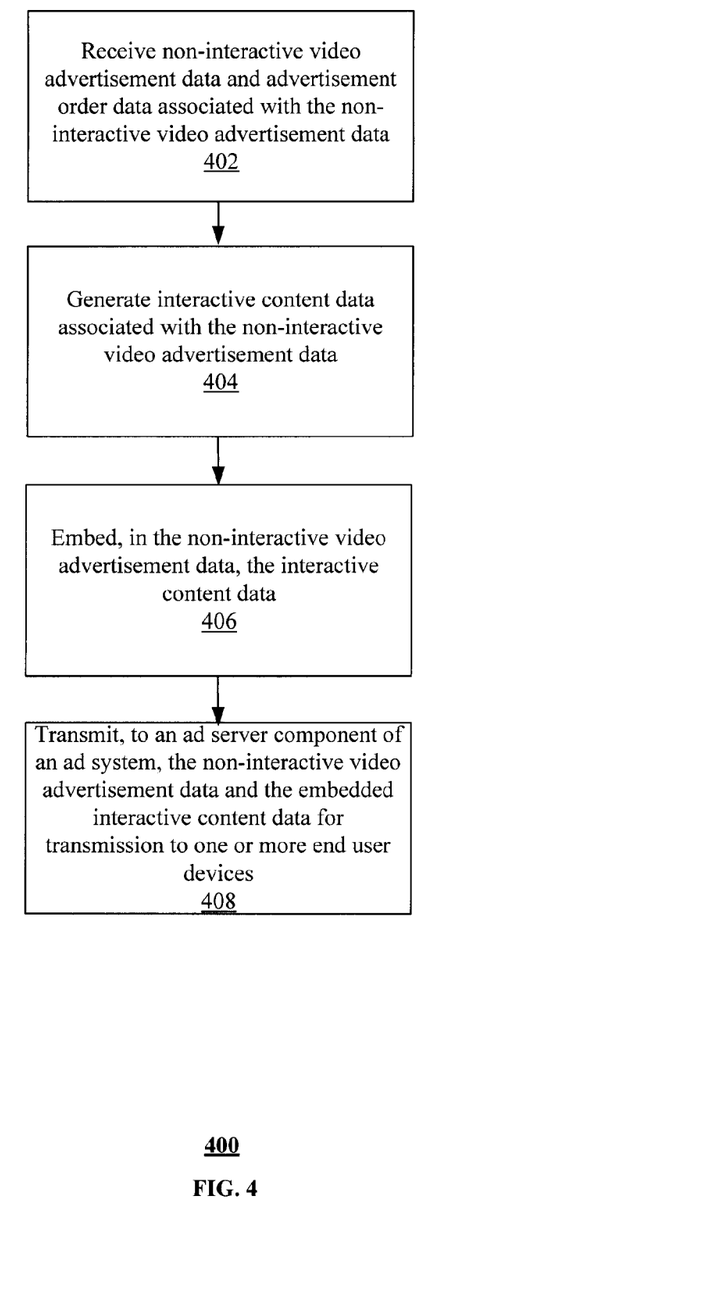
FIG. 4 is an exemplary flow chart illustrating a method of enhancing video advertising with interactive content, in accordance with one or more exemplary embodiments.

FIG. 4 is an exemplary flow chart illustrating a method of enhancing video advertising with interactive content, in accordance with one or more exemplary embodiments. This method is provided as an example; there are a variety of ways to carry out methods disclosed herein. The method 400 shown in FIG. 4 can be executed or otherwise performed by one or a combination of various systems. The method 400 is described below as carried out by the adwidgets console 202 shown in FIG. 2 by way of example, and various elements of the adwidgets console 202 are referenced in explaining the example method of FIG. 4. Each block shown in FIG. 4 represents one or more processes, methods, or subroutines carried in the method 400. Referring to FIG. 4, the method 400 may begin at block 402.

In block 402, the method 400 may include receiving non-interactive video advertisement data and advertisement order data associated with the non-interactive video advertisement data. In one embodiment, the order manager module 304 of the adwidgets console 202 may receive, from a non-interactive advertising system, the non-interactive video advertisement data and advertisement order data associated with the non-interactive video advertisement data. The non-interactive advertising system may be a legacy system used by television distributors and television broadcasters. The method 400 may continue to block 404.

In block 404, the method 400 may include generating interactive content data associated with the non-interactive video advertisement data. In one embodiment, the creative manager module 306 of the adwidgets console 202 may generate interactive content data associated with the non-interactive video advertisement data. For example, the creative manager module 306 may generate interactive content data by providing the user with a step-by-step process to define an EBIF application user interface and create the defined EBIF application. The method 400 may continue to block 406.

In block 406, the method 400 may include embedding, in the non-interactive video advertisement data, the interactive content data. In one embodiment, the publishing manager module 308 of the adwidgets console 202 may embed, in the non-interactive video advertisement data, the interactive content data. In one embodiment, embedding may include encapsulating the non-interactive video advertisement data into a packetized stream (e.g., an MPEG Packetized Elementary Stream (PES)) and encapsulating the interactive content data (e.g., an EBIF application) into another packetized stream (e.g., an MPEG Packetized Elementary Stream (PES)). The method 400 may continue to block 408.

In block 408, the method 400 may include transmitting, to an ad server component of an ad system, the video advertisement data and the embedded interactive content data for transmission to one or more end user devices. In one embodiment, the publishing manager module 308 of the adwidgets console 202 may transmit, to an ad server component of an ad system, the video advertisement data and the embedded interactive content data for transmission to one or more end user devices. An end user device may include a CPE device, a set-top box, a television, etc. The method 400 may then end.

The companion interactive advertising system may also benefit from the extant zone targeting system in use within digital cable markets. Different video advertisement assets, or different versions of the same advertisement, may be routed for distribution to distinct zones within a cable market. Because the interactive EBIF applications are embedded with the video assets, they may be carried along to the same zones as the video component without any external coordination. U.S. Provisional Patent App. Ser. No. 61/116,204 to Slothouber et al. filed Nov. 19, 2008 and entitled "Dynamic application insertion for MPEG stream switching," hereby incorporated by reference herein, discloses methods and systems for dynamically creating and inserting an application into an MPEG program transport stream wherein the application is subsequently run on a CPE device to affect switching between content streams for presentation to viewers based on other available data, such as targeting information. This may describe how targeting may be further augmented by technology embedded within the EBIF applications, removing the need for external support applications on the CPE or additional coordinating infrastructure.

The description above describes systems, networks, and devices that may include one or more modules, some of which are explicitly shown in the figures. As used herein, the term "module" may be understood to refer to any, or a combination, of computer executable software, firmware, and hardware. It is noted that the functional partition of the modules is exemplary. The modules may be combined, integrated, separated, or duplicated to support various applications. Also, a function described herein as being performed at a particular module may be performed at one or more other modules or by one or more other devices instead of or in addition to the function performed at the particular module. Further, the modules may be implemented across multiple devices or other components local or remote to one another. Additionally, the modules may be moved from one device and added to another device, or may be included in multiple devices.

It is further noted that the software described herein is tangibly embodied in one or more physical media, such as, but not limited to any, or a combination, of a compact disc (CD), a digital versatile disc (DVD), a floppy disk, a hard drive, read only memory (ROM), random access memory (RAM), flash memory, and other physical media capable of storing software. Moreover, the figures illustrate various components (e.g., systems, networks, and CPE devices) separately. The functions described as being performed at various components may be performed at other components, and the various components may be combined or separated. Other modifications also may be made.

In the instant specification, various exemplary embodiments have been described with reference to the accompanying drawings. It will, however, be evident that various modifications or changes may be made thereto, or additional embodiments may be implemented, without departing from the broader scope of the invention as set forth in the claims that follow. The specification and drawings are accordingly to be regarded in an illustrative rather than a restrictive sense.

The invention claimed is:

1. A computer-implemented method of enhancing video advertising with interactive content, the computer-implemented method comprising:
   receiving non-interactive video advertisement data and advertisement order data associated with the non-interactive video advertisement data from an extant non-interactive order entry system;
   generating interactive content data associated with the non-interactive video advertisement data;
   embedding, in the non-interactive video advertisement data, the interactive content data, wherein the interactive content data is configured to provide interactivity to an extant non-interactive advertisement received from an extant order entry system; and
   transmitting, to an ad server component of an extant ad system, the non-interactive video advertisement data and the embedded interactive content data as a static asset for transmission to one or more end user devices, wherein the ad server component manages the non-interactive video advertisement data embedded with the interactive content data alongside other non-interactive video advertisement data.

2. The computer-implemented method of claim 1, wherein the advertisement order data comprises a spot identifier.

3. The computer-implemented method of claim 1, wherein the interactive content data comprises an Enhanced TV Binary Interchange Format (EBIF) application.

4. The computer-implemented method of claim 1, wherein the interactive content data comprises an Open Cable Application Platform (OCAP) application.

5. The computer-implemented method of claim 1, wherein embedding the interactive content data further comprises:
   associating the non-interactive video advertisement data with a first Packetized Elementary Stream (PES);
   associating the interactive content data with a second Packetized Elementary Stream (PES); and
   identifying each PES by a packet identifier stored in a map table.

6. The computer-implemented method of claim 1, wherein the one or more end user devices comprise one or more Customer Premises Equipment (CPE) devices.

7. The computer-implemented method of claim 6, wherein the non-interactive video advertisement data and the embedded interactive content data are processed on the one or more Customer Premises Equipment (CPE) devices.

8. The computer-implemented method of claim 6, wherein the non-interactive video advertisement data and the embedded interactive content data are processed on the one or more Customer Premises Equipment (CPE) devices that are associated with a particular geographic region.

9. The computer-implemented method of claim 6, wherein the one or more Customer Premises Equipment (CPE) devices comprise one or more set-top boxes.

10. The computer-implemented method of claim 1, further comprising receiving, from the one or more end user devices, usage data and fulfillment data.

11. The computer-implemented method of claim 10, wherein said usage data and fulfillment data is used to update spot metrics data associated with extant order entry or campaign management system.

12. The computer implemented method of claim 1, wherein generating interactive content data associated with the non-interactive video advertisement data comprises providing a step-by-step process to create a user interface and application constituting said interactive content data.

13. A computer-implemented system for enhancing video advertising with interactive content, the computer-implemented system comprising:
   an order manager computing apparatus configured to receive non-interactive video advertisement data and advertisement order data associated with the non-interactive video advertisement data from an extant non-interactive order entry system;
   a creative manager computing apparatus configured to generate interactive content data associated with the non-interactive video advertisement data; and
   a publishing manager computing apparatus configured to embed, in the non-interactive video advertisement data, the interactive content data, wherein the interactive content data is configured to provide interactivity to an extant non-interactive advertisement received from an extant order entry system, and transmit, to an ad server component of an extant ad system, the non-interactive video advertisement data and the embedded interactive content data as a static asset for transmission to one or more end user devices, wherein the ad server component is configured to manage the non-interactive video advertisement data embedded with the interactive content data alongside other non-interactive video advertisement data.

14. The computer-implemented system of claim 13, wherein the advertisement order data comprises a spot identifier.

15. The computer-implemented system of claim 13, wherein the interactive content data comprises an Enhanced TV Binary Interchange Format (EBIF) application.

16. The computer-implemented system of claim 13, wherein the interactive content data comprises an Open Cable Application Platform (OCAP) application.

17. The computer-implemented system of claim 13, wherein the publishing manager computing apparatus is configured to embed the interactive content data by:
   associating the non-interactive video advertisement data with a first Packetized Elementary Stream (PES);
   associating the interactive content data with a second Packetized Elementary Stream (PES); and
   identifying each PES by a packet identifier stored in a map table.

18. The computer-implemented system of claim 13, wherein the one or more end user devices comprise one or more Customer Premises Equipment (CPE) devices.

19. The computer-implemented system of claim 18, wherein the non-interactive video advertisement data and the embedded interactive content data are processed on the one or more Customer Premises Equipment (CPE) devices.

20. The computer-implemented system of claim 18, wherein the non-interactive video advertisement data and the embedded interactive content data are processed on the one or more Customer Premises Equipment (CPE) devices that are associated with a particular geographic region.

21. The computer-implemented system of claim 18, wherein the one or more Customer Premises Equipment (CPE) devices comprise one or more set-top boxes.

22. The computer-implemented system of claim 13, further comprising a reporting manager computing apparatus configured to receive, from the one or more end user devices, usage data and fulfillment data.

23. The computer-implemented system of claim 13, wherein the order manager computing apparatus is configured to receive the non-interactive video advertisement data from a non-interactive advertising system.

* * * * *